United States Patent [19]

Fujiwara et al.

[11] Patent Number: 4,928,382

[45] Date of Patent: May 29, 1990

[54] METHOD OF THE PRODUCTION OF A MAGNETIC HEAD

[75] Inventors: Hideo Fujiwara, Ibaragi; Takeshi Tottori, Toride; Osamu Inagoya; Hirosuke Mikami, both of Ibaragi, all of Japan

[73] Assignee: Hitachi Maxell, Ltd., Osaka, Japan

[21] Appl. No.: 296,368

[22] Filed: Jan. 9, 1989

Related U.S. Application Data

[63] Continuation of Ser. No. 899,083, Aug. 22, 1986, abandoned.

[30] Foreign Application Priority Data

Aug. 23, 1985 [JP] Japan .................. 60-183833

[51] Int. Cl.⁵ .......................................... G11B 5/127
[52] U.S. Cl. ........................................ 29/603; 148/108
[58] Field of Search ......................... 148/108; 29/603

[56] References Cited

U.S. PATENT DOCUMENTS 3,039,891 6/1962 Mitchell .............................. 148/108
4,268,325 5/1981 O'Handley et al. ................ 148/108
4,473,415 9/1984 Ochiai et al. ........................ 148/108
4,475,962 10/1984 Hayakawa et al. ................. 148/108

FOREIGN PATENT DOCUMENTS 59-6360 1/1984 Japan .................................. 148/108
59-200748 11/1984 Japan ................................. 148/108

Primary Examiner—John P. Sheehan
Attorney, Agent, or Firm—Birch, Stewart, Kolasch & Birch

[57] ABSTRACT

In manufacturing a magnetic head having a magnetic circuit formed of magnetic material in which anisotropy can be induced, the magnetic head is processed by a first annealing process in a magnetic field for inducing anisotropy to generate an axis of easy magnetization in one direction in a part of the magnetic material, subsequently the magnetic head is processed by a second annealing process for annealing the magnetic material, applying the magnetic field in one of the directions perpendicular to the axis of the easy magnetization so as to relax the anisotropy induced by the first annealing process.

13 Claims, 2 Drawing Sheets

METHOD OF THE PRODUCTION OF A MAGNETIC HEAD

This application is a continuation of application Ser. No. 899,093 filed on Aug. 22, 1986, now abandoned.

BACKGROUND IN THE INVENTION

1. Field of the Invention

The present invention relates to a method in the production of a magnetic head and more particularly to a method of annealing processing a magnetic head under a magnetic field.

2. Description of the Prior Art

There has been known to the public magnetic heads made using such a magnetic material that the magnetic anisotropy is induced under a magnetic field during an annealing process in at least a part of the magnetic head In the process of manufacturing the magnetic heads of the above type, there is generated a plurality of magnetic domains in the magnetic material, causing the permeability to be decreased due to generation of the magnetic anisotropy for stabilizing the magnetization in the magnetic domains and magnetic walls. In order to decrease the effect of the generation of the anisotropy, the magnetic material is usually subjected to an annealing process under a magnetic field. In the annealing process under the magnetic field, various experiments have been made to seek suitable processing conditions such as the magnetic directions and temperature and time of the annealing processing. Particularly, in order to manufacture the magnetic heads with good high frequency characteristics, it has been well known to orient the axis of easy magnetization of the anisotropy in a direction perpendicular to the direction of magnetic flux in the magnetic flux path of the magnetic head.

Accordingly, in a magnetic head as shown in FIGS. 1 and 2, when forming a magnetic thin film 12, the direction of the magnetic field is oriented in the a direction of the width W of the head core. In FIGS. 1 and 2, 11 denotes a substrate, 12 is the magnetic thin film made of Fe-Ni alloy, 13 is a gap regulating film, 14 is a coil and 15 is an insulation film.

In case magnetic anisotropy caused by the annealing is strong, a sufficient permeability can not be obtained. Therefore, there is required any kind of process to decrease the magnetic anisotropy.

One known method of decreasing the magnetic anisotropy is to apply a rotation magnetic field onto a magnetic head assembly during the forming of the magnetic thin film on the substrate. However, the apparatus for applying the rotation magnetic field is very complicated and is not suitable for mass-production.

Another method is to make the temperature during formation of the magnetic thin film as high as possible so as to decrease the magnetic anisotropy. In the case when the magnetic thin film is formed of a poly crystalline material, the grain diameter of the crystal becomes larger at the high temperature, thereby resulting in a decrement of the permeability. On the other hand, in case when the magnetic thin film is formed of an amorphous material, the amorphous material is crystallized in the high temperature range, resulting in a decrement of the permeability. Thus the second method is also not sufficient to obtain a good result In addition, there has been proposed another kind of magnetic head employing head cores made of amorphous magnetic material of the strip type formed by way of the rapid quenching method. In this method, it is difficult to control the magnetic anisotropy at the time of the production of the amorphous magnetic material. Therefore, the magnetic anisotropy is controlled by annealing under the magnetic field at the time immediately after production of the strip type amorphous magnetic material or after the magnetic core is formed. However, since the initial conditions of the amorphous material are different portion by portion of and/or product by product, it is difficult to control the magnetic anisotropy in a uniform manner.

SUMMARY OF THE INVENTION

An essential object of the present invention is to provide a method in the production of magnetic heads having good magnetic characteristics with a uniform quality.

The present invention is directed to a method in the production of magnetic heads in which at least one portion of a magnetic circuit of the magnetic head is formed of the magnetic material in which the magnetic anisotropy is induced by an annealing process under the magnetic field.

According to the present invention, the method includes a first annealing process with the magnetic field for orientation of the magnetizable axis of the magnetic material in one predetermined direction, and a second annealing process under a magnetic field having a predetermined direction perpendicular to the magnetizable axis, so that the magnetic anisotropy in a desired direction is generated by the first annealing process, thereafter the magnetic anisotropy thus generated being relaxed by the second annealing process, whereby the permeability is increased to improve the magnetic characteristics.

As the magnetic material used in the magnetic head according to the present invention, there may be used an amorphous composition and a poly crystalline composition containing at least one element selected from the iron, nickel and cobalt group, such as iron-nickel alloy, cobalt-niobium alloy and cobalt-zirconium alloy as a main composition.

DETAILED DISCUSSION

Figure 1:
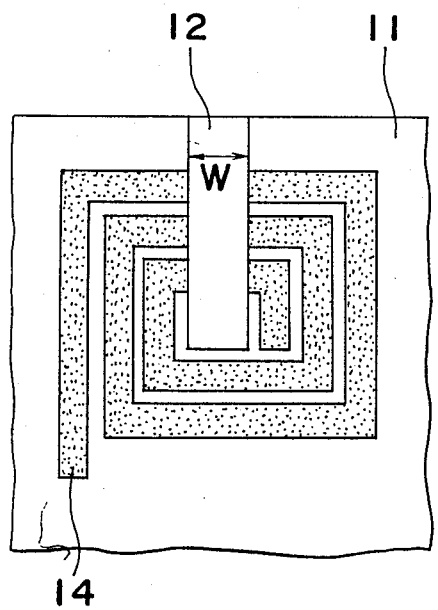
FIG. 1 is a top plan view of a conventional magnetic head.
Figure 2:
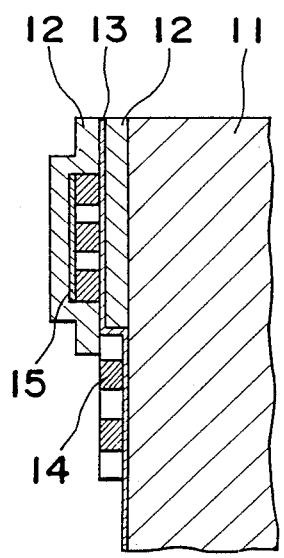
FIG. 2 is a cross sectional view of FIG. 1.

It is known that the induced magnetic anisotropy can be induced according to the Arrhenius Equation. Expressing the magnetic anisotropy constant by K, the equation is expressed as follows:

$$K = K_i + [K_O(T) - K_i]\{1 - \exp(-t/\tau(T))\} \tag{1}$$

wherein $K_i$: initial value;

$K_O(T)$: constant depending on the absolute temperature and the kinds of composition;

$t$: time; and $\tau(T)$: relaxation time depending on the absolute temperature.

$\tau(T)$ in the equation (1) may be expressed as (2):

$$1/\tau(T) = A \exp(-E_a/kT) \tag{2}$$

wherein
A: constant
Ea: activation energy
k: Boltzmann constant

The term $1/\tau$ is referred to as a rate coefficient.

Accordingly, an annealing process under the magnetic field for a sufficient length of time compared to $\tau(T)$, corresponding to the equation (2), enables the magnetic anisotropy to be uniform irrespective of the difference of the initial condition of the material.

The first annealing process of the present invention is employed to enable the condition mentioned above. That is, the first annealing process causes the initial condition to be uniform so as to suppress the dispersion of the magnetic anisotropy after the second annealing process.

Since the magnetic anisotropy after the first annealing process is excessive, there can not be obtained a sufficient high permeability. The second annealing process is employed to relax the excessive magnetic anisotropy.

The change of the magnetic anisotropy in terms of time is expressed by the equation (3):

$$K = K1 - [K1 + K_O(T')][1 - \exp(-t/\tau(T'))] \tag{3}$$

wherein
K1: the magnetic anisotropy induced by the first annealing process;
T': the temperature during the second annealing process and
$K_O(T')$: the magnetic anisotropy coefficient when the thermal equibillium is reached under the temperature T.

In order to obtain a sufficiently large permeability, it is necessary to make the magnetic anisotropy sufficiently smaller than K1. For this purpose, assuming that the processing time of the second annealing process is tz, the following equation (4) can be obtained:

$$\frac{t_2}{\tau(T')} \simeq \ln\left[1 + \frac{k_1}{k_0(T')}\right] \tag{4}$$

If k1 is dispersed in a range $\pm \Delta K1$ with respect to $K_{10}$, by an annealing process under the condition expressed by the equation (5), $$\frac{t_2}{\tau(T')} \simeq \ln\left[1 + \frac{k_{10}}{k_0(T')}\right] \tag{5}$$

K is dispersed in the range $$\pm \frac{K_0(T)}{K_0(T) + K_{10}} \cdot \Delta K_1.$$

Accordingly, it is desired to make $\Delta K_1$ as small as possible for decreasing the dispersion of the magnetic characteristics.

As the method decreases $\Delta K_1$ as small as possible, the first approach is to keep the condition during the first annealing process constant. However, as is apparent from the equation (1), in case the initial condition of the composition is dispersed, the value $\Delta K_1$ can not be small if only the condition of the first annealing process is kept constant.

In the equation (1), assuming that the value Ki is dispersed in the range $\pm K_O$, in order for the value K to be present in the range expressed by (6) below, then equation (7) must be satisfied.

$$K \geq rK_o(T) \tag{6}$$

wherein r is a positive number smaller than 1.

$$\frac{t_1}{\tau(T)} \geq \ln\frac{2}{1-r} \tag{7}$$

wherein $t_1$ is annealing process time.

In order to make $r = 0.8$, equation (8) must be satisfied.

$$t_1/\tau(T) > \text{Ln } 10 = 2.3 \tag{8}$$

By performing the annealing process under such condition mentioned above, $K_1$ is in the dispersion range of $\pm 10\%$.

In the second annealing process, it is desired to satisfy the equation (5), whereby it is necessary to satisfy the condition expressed by the equation (9) as $K_{10}$ is nearly equal to $K_O'$.

$$\frac{t_2}{\tau(T')} \leq 1. \tag{9}$$

When the temperature in the first annealing process is substantially equal to the temperature in the second annealing process, the equation (10) should be satisfied in case the value $K_1$ is in the range of 0.8 $K_O(T)$ to 0.9 $K_O(T)$.

$$0.6 \leq \frac{t_2}{\tau(T')} \leq 0.65 \tag{10}$$

The condition mentioned above is made on the premise that the temperature of the magnetic material is regulated to the desired value rapidly. However, in actuality it is necessary to consider the effect of the temperature rising and temperature falling. Accordingly, the optimum condition should be decided through various experiments by controlling the speeds of either the temperature rising or the temperature falling, changing the highest temperature and its holding time.

As to the condition of the first annealing process, as the magnetic anisotropy induced is reached at the saturation value, the dispersion of the initial condition against the second annealing process becomes decreased. Therefore, it is desired to shorten the annealing time by making the annealing temperature as high as possible, decreasing the value $\tau(T)$ within such a range that actual bad effects, such as a change of the quality of the magnetic material can be suppressed.

On the other hand, as to the second annealing process, the optimum annealing temperature should be decided so that the holding time of the maximum temperature is most suitable in view of making the control easy.

It is desired that the strength of the applied magnetic field be greater than the strength of the demagnetizing field with respect to the applied magnetic field for making the difference of the direction of the magnetization during annealing from the direction of the applied magnetic field as small as possible.

It is may be possible to replace the first annealing process by the process of piling the magnetic layers under the magnetic field in case the magnetic path is formed of piled magnetic sheets.

PREFERRED EMBODIMENTS

Example 1

Figure 3:
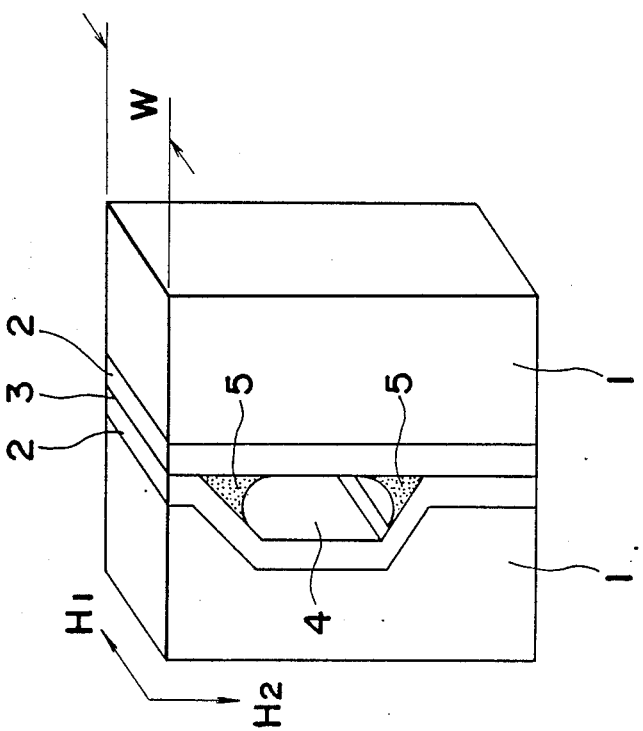
FIG. 3 is a perspective view showing an essential portion of the magnetic head according to the present invention.

FIG. 3 shows an example of the magnetic head according to the present invention.

In FIG. 3, a substrate 1 of the head core of width W is made of non magnetic material, such as Zn-Ferrite. Magnetic thin layers 2 are made so as to lay on two opposing surfaces of the substrate 1 forming a head gap, the layers 2 being made of an amorphous magnetic alloy (of saturation magnetic flux density about 10 KG), cobalt (85% by weight) and zirconium (15% by weight). The layers 2 are formed to about 20 $\mu$m in thickness by way of sputtering. The head core includes head gap regulating thin film 3, a coil window 4 for winding an exciting coil (not show) around the substrate 1, passing through the window 4 and a glass layer 5. The thickness of the magnetic thin layer 2 is selected from 1 to 100 $\mu$m in order to improve the magnetic characteristics.

A magnetic head, as shown in FIG. 3, was prepared and write and read characteristics with metal powder tape was measured. The magnetic head was subjected to an annealing process with magnetic field (annealing in H1) under such a condition that the magnetic field coincided with the direction W of the width of the head core, subsequently, the magnetic head was subjected to another annealing process with magnetic field (annealing in H2) under such a state that the direction of the magnetic filed coincided with the direction of the depth of the head gap. Each time the frequency characteristics were measured. The annealing conditions are as follows:

TABLE

| ANNEALING CONDITION IN THE MAGNETIC FIELD | | | |
|---|---|---|---|
| NO. | DIRECTION | MAX. TEMP. (°C.) | TIME (MIN.) |
| 1 | H1 | 330 | 10 |
| 2 | H2 | 320 | 10 |
| 3 | H1 | 350 | 30 |
|   | H2 | 305 | 10 |
| 4 | H1 | 350 | 30 |
|   | H2 | 310 | 10 |
| 5 | H1 | 350 | 30 |
|   | H2 | 320 | 10 |
| 6 | H1 | 350 | 30 |
|   | H2 | 330 | 10 |
| 7 | H1 | 350 | 30 |
|   | H2 | 340 | 10 |

In the table, direction means the direction of the applied magnetic field, max. temp. means the applied maximum temperature and time means the duration of time during which the maximum temperature was applied.

In the example, the magnetic field intensity during annealing was about 15 K oerstead, temperature rising speed and temperature falling speed were 13 deg/min. in the range higher than 200° C.

Explaining the table, the sample 1 was a magnetic head without annealing in the magnetic field (the magnetic field of the initial condition) which was annealed under 330° C. for 10 minutes in the magnetic field of H1 direction. Sample 2 was a magnetic head same as the magnetic head of the sample 1 except that the direction of the magnetic field was H2 and anneal was performed at the highest temperature of 320° C. for 10 minutes, sample 3 was the same magnetic head as the sample 2 except that the magnetic field of H1 was applied first with anneal at 350° C. for 30 minutes, then subsequently the magnetic field of H2 was applied with anneal at 305° C. for 10 minutes, the sample 4 was the same magnetic head as the sample 3 except that the magnetic field of H1 was further applied with anneal at 350° C. for 30 minutes subsequently the magnetic field of H2 was applied with anneal at 310° C. for 10 minutes. As mentioned above, all of the samples are subjected to the magnetic fields of H1 and H2 and anneal repeatedly.

Figure 4:
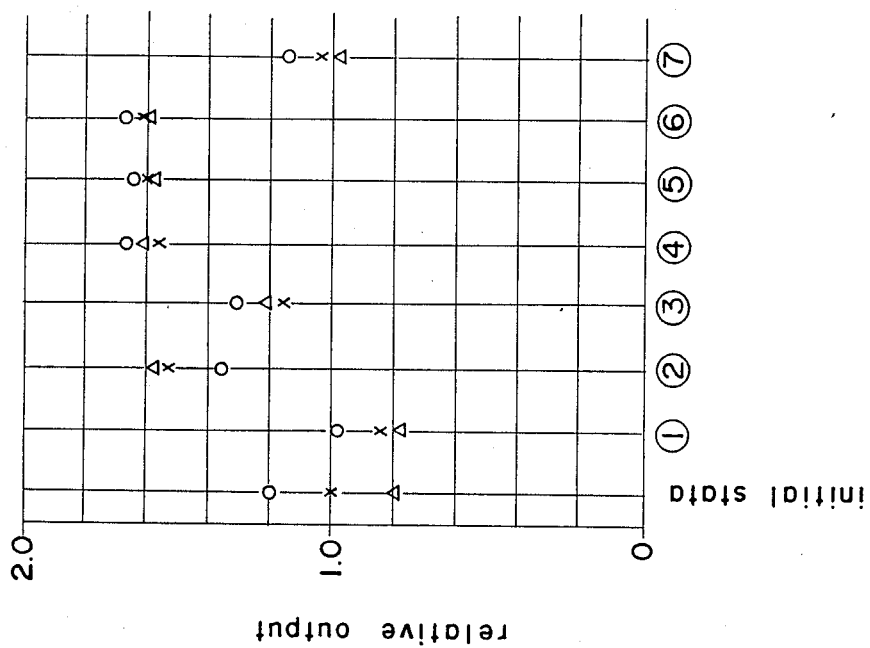
FIG. 4 is a graph showing various results of the tests performed on the samples of the magnetic heads.

Test was made using three samples for each groups of 1 to 7. Result of the tests are shown in FIG. 4 in which o, x and $\Delta$ represent the respective characteristic value. Distance between the respective marks o, x and $\Delta$ represents the dispersion of the respective samples of the magnetic heads and the long distance represents a large dispersion of the products and the short distance between the marks represents a small dispersion of the products.

From the test it is understood that the samples No. 2 to No. 7 have high relative outputs, particularly the samples 4, 5 and 6 all have high outputs with small dispersion.

The anneal process for the magnetic head of the sample 2 in terms of the second magnetic process H2 was the same as the anneal process for the sample 5. However, in the sample 2, since the maximum temperature of the first annealing condition of the sample 2 which corresponds to the annealing condition for the sample 1 is lower than the condition for the sample 5, it can be noticed that the induced anisotropy of the sample 2 did not reach the saturation and the dispersion of the product is remarkable.

As to the magnetic head of the sample 3, since the maximum temperature of the second annealing with the magnetic field H2 is slightly low, a sufficient characteristic can not be obtained.

As to the magnetic head of the sample 7, since the maximum temperature of the second annealing with the magnetic field H2 is excessively high, the relative output is decreased.

Compared with the above samples, the magnetic heads of the samples 4, 5 and 6 have high outputs with small dispersion of the products since the temperatures of both first and second anneal with the magnetic fields H1 and H2 are suitable.

In the example mentioned above, the respective directions of the applied field in the first and second annealing processes with the magnetic field may be replaced. It has been noticed that replacement of the direction of the magnetic field mentioned above has never badly affected to the various effects mentioned above.

Principally, the direction of the applied magnetic fields may be perpendicular each other for obtaining good effects. In case the portions of the head made of the magnetic material are shaped with a symmetry, with the symmetric axis thereof selected as one of the directions of the applied magnetic field, it is easy to orient the magnetization direction in the magnetic material with the direction of the applied magnetic field uniformly, therefore it is possible to obtain the effect of the annealing processing uniformly everywhere and specific control of the magnetization is also possible.

In view of the technical meaning mentioned above, in the thin film head, it is possible to select the direction perpendicular to the surface of the magnetic film as one of the directions of the applied magnetic field. However, in this case the counter magnetic field is strong, thus it is necessary to make the applied magnetic field strong.

Example 2

A plurality of the magnetic heads having the shape as shown in FIG. 3 were prepared, and were subjected to the first anneal process with magnetic field of H2 with 15 K oerstead and at the maximum temperature 350° C. for 30 minutes keeping the maximum temperature. Subsequently, the magnetic heads were subjected to the second anneal process with magnetic field of H1 with 15 K oerstead at the maximum temperature 320° C. for 10 minutes keeping the maximum temperature. After those annealing, the magnetic head has a low dispersion with the outputs of 1.4 to 1.6 times of those of the magnetic heads without annealing.

Example 3

As the first annealing with the magnetic field, it may be preferred to anneal the magnetic head already assemble in the shape of the magnetic head as shown in FIG. 3, it may be possible to anneal applying the magnetic fields in the predetermined direction at the time of sputtering of the thin magnetic thin layer 2 on the substrate during the manufacturing of the magnetic heads.

Example 3 is directed to the method mentioned above.

The magnetic thin film 2 was formed on the substrate made of Zn-ferrite using amorphous magnetic alloy of cobalt (85% by weight)-zirconium (15% by weight) under the following sputtering condition;

(1) diameter of the target 203 mm
(2) vacuum $5 \times 10^{-3}$ torr with argon
(3) radio frequency of 800 Watts
(4) sputtering rate of 3 $\mu$m/hour.

In this case, the magnetic thin layer was bonded on the substrate under the magnetic field of about 100 oerstead in the direction corresponding to the direction H1 of the widthwise direction of the head core of the magnetic head.

The parts of the substrate thus obtained were assembled to form the magnetic head, thereafter the magnetic field was applied in the direction H2 and the second annealing was processed at the maximum temperature 320° C. for 10 minutes keeping the maximum temperature. The dispersion of the magnetic heads thus annealed were few with high output 1.4 to 1.6 times compared to the magnetic head without the annealing process.

Example 4

The annealing process according to the present invention is also effective to obtain a good effect in case of using poly crystalline magnetic alloy such as Sendust magnetic alloy, Permalloy magnetic alloy (NI 78-80% by weight-Mo 0-2% by weight-Fe 17-20% by weight) or Fe 84% by weight - Al 16% by weight alloy, Fe 49% by weight-Co 49% by weight - Ru 2% by weight alloy. Magnetic head using Sendust (Fe 85% by weight - Si 9.6% by weight - Al 5.4% by weight) as the magnetic thin layer were prepared under the same condition of the sample 5. The magnetic thin layer made of Sendust was formed under the same sputtering condition as used in the example 2. The magnetic heads thus obtained have high output of 1.4 to 1.6 times of the output of the magnetic head without annealing according to the present invention.

As mentioned above, the first annealing with the magnetic field of the present invention enables the inducement of a relatively large amount of anisotropy in the magnetic portion of the magnetic head and the second annealing with the magnetic field enables the relaxing of the anisotropy so as to make the permeability large, whereby good magnetic characteristics for the magnetic head can be obtained with a simple apparatus and simple processing.

The invention being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A method in the production of a magnetic head having a magnetic circuit, at least one part of the circuit being formed of a magnetic head core of magnetic material of a predetermined width in which anisotropy can be induced, comprising:

providing a magnetic head which comprises a core material including substrates which each have a magnetic thin layer of magnetic material formed on opposing surfaces thereof, said magnetic thin layers each having a thickness of from 1-100 $\mu$m, and a head gap film formed between said magnetic thin layers;

annealing said magnetic head in a first annealing process at a first temperature under a first magnetic field of a first intensity for inducing one axis of easy magnetization in a part of the magnetic material in said magnetic head, the direction of said magnetic field during said first annealing process coinciding with the width direction of said head gap film along a first surface of said head core; and annealing said magnetic head in a second annealing process at a second temperature under a second magnetic field of a second intensity following said first annealing process, the direction of said second magnetic field during said second annealing process coinciding with the depth direction of said head gap film and being perpendicular to the direction of said first magnetic field and to said one axis of easy magnetization along a second surface of said head core such that a magnetic anisotropy generated by said first annealing process is relaxed by said second annealing process whereby the permeability of said magnetic material is increased to improved the magnetic characteristics of said magnetic head, said annealing temperature being higher than 200° C.

2. The method according to claim 1, wherein the intensity of the first magnetic field is stronger than the intensity of the second magnetic field.

3. The method according to claim 1, wherein the product between the speed rate of the induction of the anisotropy and the annealing time under the first annealing process is greater than the product between the speed rate of the induction of the anisotropy and the annealing time in the second annealing process.

4. The method according to claim 1, wherein the annealing condition of the second annealing process cancels the anisotropy induced by the first annealing process.

5. The method according to claim 1, wherein the direction of the magnetic field during the second annealing process coincides with the direction of the depth of the head gap.

6. The method according to claim 1, wherein at least the part near the head gap of the magnetic head is formed by the magnetic material which induces the anisotropy by the annealing process with the magnetic field.

7. The method according to claim 1, wherein the magnetic material inducing the anisotropy is a poly crystalline material including at least one element selected from the group consisting of iron, nickel and cobalt as the main composition.

8. The method according to claim 1, wherein the magnetic material inducing the anisotropy is amorphous material including at least one kind of element selected from the group consisting of iron, nickel and cobalt as the main composition.

9. The method according to claim 1, wherein the part of the magnetic head formed of said magnetic material in which anisotropy is induced is formed by physical vaporing, chemical vaporing or plating.

10. The method according to claim 1, wherein said magnetic thin layers are formed on said respective substrates by sputtering during said first annealing process while applying said magnetic field in said defined direction, said core material being assembled to form said magnetic head, and thereafter said second annealing process is performed.

11. The method according to claim 1, wherein said second temperature is in the range of from 305° to 330° C.

12. The method according to claim 1, wherein said magnetic head further comprises a coil window which passes along said head gap film between said magnetic thin layers.

13. The method according to claim 12, wherein said core window includes at least a glass layer.

* * * * *